US009528687B1

(12) United States Patent
Kress et al.

(10) Patent No.: US 9,528,687 B1
(45) Date of Patent: Dec. 27, 2016

(54) TRANSMISSION APPARATUS FOR BEAM EXPANSION

(71) Applicant: X Development LLC, Mountain View, CA (US)

(72) Inventors: Bernard Kress, Redwood City, CA (US); Jeremy Brouillet, Palo Alto, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 177 days.

(21) Appl. No.: 13/937,857

(22) Filed: Jul. 9, 2013

(51) Int. Cl.
*H04B 10/00* (2013.01)
*H04B 10/12* (2006.01)
*F21V 13/04* (2006.01)
*H04B 10/11* (2013.01)
*H04B 10/112* (2013.01)

(52) U.S. Cl.
CPC .............. *F21V 13/04* (2013.01); *H04B 10/11* (2013.01); *H04B 10/112* (2013.01); *H04B 10/1125* (2013.01)

(58) Field of Classification Search
CPC .................................................. H04B 10/1121
See application file for complete search history.

(56) References Cited

U.S. PATENT DOCUMENTS

| 4,453,806 A * | 6/1984 | Wick | A61F 9/008 359/641 |
| 5,161,045 A * | 11/1992 | Hutchin | H04B 10/50 359/196.1 |
| 6,278,534 B1 * | 8/2001 | Arns | G01J 3/02 356/334 |
| 6,714,705 B1 * | 3/2004 | Lin | G02B 6/29311 359/566 |

(Continued)

FOREIGN PATENT DOCUMENTS

WO          9835506          8/1998

OTHER PUBLICATIONS

Fidler et al., Optical Communications for High-Altitude Platforms, 2010, IEEE, pp. 1058-1070.*

(Continued)

*Primary Examiner* — Ken N Vanderpuye
*Assistant Examiner* — Jai Lee
(74) *Attorney, Agent, or Firm* — McDonnell Boehnen Hulbert & Berghoff LLP

(57) ABSTRACT

Transmission apparatus for beam expansion are disclosed. A transmission apparatus includes a light source configured to emit an optical signal, a first feature comprising a diffractive element and a reflective element, and a second feature that is substantially aligned with the first feature. The diffractive element is substantially aligned with the light source to receive the optical signal. The second feature includes an inner surface that is partially reflective and partially trans- (Continued)

missive. The first feature is located between the light source and the second feature. The diffractive element is configured to diffract the optical signal, the second feature is configured to: (a) reflect a first portion of the diffracted optical signal and (b) transmit a second portion of the diffracted optical signal to a destination balloon; and the second feature is further configured to transmit at least part of the first portion of the diffracted optical signal to the destination balloon.

20 Claims, 12 Drawing Sheets

(56) References Cited

U.S. PATENT DOCUMENTS

| | | | | |
|---|---|---|---|---|
| 6,721,510 | B2* | 4/2004 | Graves | H04B 10/1125 398/122 |
| 6,775,439 | B2* | 8/2004 | Takano | G02B 6/12007 385/129 |
| 6,867,889 | B1* | 3/2005 | Amadon et al. | 359/16 |
| 6,876,679 | B1* | 4/2005 | Bowler | G02B 6/29365 372/101 |
| 6,967,754 | B2* | 11/2005 | Bratt et al. | 359/15 |
| 7,359,639 | B2 | 4/2008 | Wolcott et al. | |
| 7,567,779 | B2* | 7/2009 | Seligsohn et al. | 455/12.1 |
| 8,366,003 | B2 | 2/2013 | Mohan et al. | |
| 2001/0007605 | A1* | 7/2001 | Inagaki | G02B 6/29358 385/123 |
| 2002/0110304 | A1* | 8/2002 | Werkheiser | G02B 6/3803 385/8 |
| 2003/0030908 | A1* | 2/2003 | Cheng et al. | 359/577 |
| 2003/0040273 | A1* | 2/2003 | Seligsohn | B64B 1/44 455/12.1 |
| 2005/0243421 | A1* | 11/2005 | Arns | G02B 27/4244 359/558 |
| 2006/0098988 | A1* | 5/2006 | Sekiya et al. | 398/147 |
| 2007/0177880 | A1 | 8/2007 | Karasikov et al. | |
| 2012/0168555 | A1 | 7/2012 | Shcherbakov et al. | |

OTHER PUBLICATIONS

Brown, Stephen N., Theory and Simulation of Subwavelength High Contrast Gratings and Their Applications in Vertical-Cavity Surface-Emitting Laser Devices, 2011, Thesis submitted to Graduate College of the University of Illinois at Urbana-Champaign.*

Song et al., Investigation of Geometrical effects of antireflective subwavelength gratings structures for optical device applications, 2009, Springer Science+Business Media, LLC., pp. 771-777.*

Hodgkinson et al., Birefringent Thin Films and Polarizing Elements, 1997, World Scientific Publishing Co., pp. 203-207.*

Kress et al., Applied Digital Optics: From Micro-Optics to Nanophotonics, 2009, John Wiley & Sons, Ltd. pp. 171-172.*

Sharma, Optics: Principles and Applications, 2006, pp. 301-304.*

Newport Corportaion, The physics of diffraction gratings, 2005.*

Fidler et al., Optical Communicatios for High-Altitude Platforms, 2010, IEEE, pp. 1058-1070.*

Kane, Daniel, "Origami Lens" Slims High Resolution Cameras, http://ucsdnews.ucsd.edu/newsrel/science/foldedlens07.asp, Regents of the University of California, Jan. 30, 2007.

Kress, Bernard C. et al., Applied Digital Optics from Micro-Optics to Nanophotonics, Chapters 5-7, 9-10, 12, 14 and 16, John Wiley & Sons, Ltd., 2009.

Shirasaki, "Virtually Imaged Phased Array", Fujitsu Sci. Tech. J., 35 1, pp. 113-125 (Jul. 1999).

* cited by examiner

TRANSMISSION APPARATUS FOR BEAM EXPANSION

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

SUMMARY

Transmission apparatus for beam expansion are disclosed herein. Beneficially, embodiments described herein may help reduce the weight and/or space of an optical transmitter without sacrificing other performance aspects of the optical transmitter.

In one aspect, an apparatus includes (i) a light source configured to emit an optical signal; (ii) a first feature comprising a diffractive element and a reflective element, and wherein the diffractive element is substantially aligned with the light source to receive the optical signal; and (iii) a second feature that is substantially aligned with the first feature, wherein an inner surface of the second feature is partially reflective and partially transmissive, wherein the first feature is located between the light source and the second feature; wherein the diffractive element of the first feature is configured to diffract the optical signal; wherein the second feature is configured to: (a) reflect a first portion of the diffracted optical signal and (b) transmit a second portion of the diffracted optical signal to a destination balloon; wherein the reflective element of the first feature is configured to reflect the first portion of the diffracted optical signal to the second feature; and wherein the second feature is further configured to transmit at least part of the first portion of the diffracted optical signal to the destination balloon.

In another aspect, an apparatus includes (i) a light source configured to emit an optical signal; (ii) a first feature comprising a diffractive element and a reflective element, wherein the diffractive element is substantially aligned with the light source to receive the optical signal; and (iii) a second feature that is substantially aligned with the first feature, wherein an inner surface of the second feature is partially reflective and partially transmissive, wherein the first feature is located between the light source and the second feature, and wherein the light source, the first feature, and the second feature are arranged, such that (a) the optical signal emitted from the light source having a first dimension is diffracted by the diffractive element and (b) the diffracted optical signal is expanded to a beam having a second dimension and transmitted to a destination balloon based on reflection of the diffracted optical signal by the reflective element and partial reflection and partial transmission of the diffracted optical signal by the second feature.

These as well as other aspects, advantages, and alternatives, will become apparent to those of ordinary skill in the art by reading the following detailed description, with reference where appropriate to the accompanying drawings.

DETAILED DESCRIPTION

Figure 1:
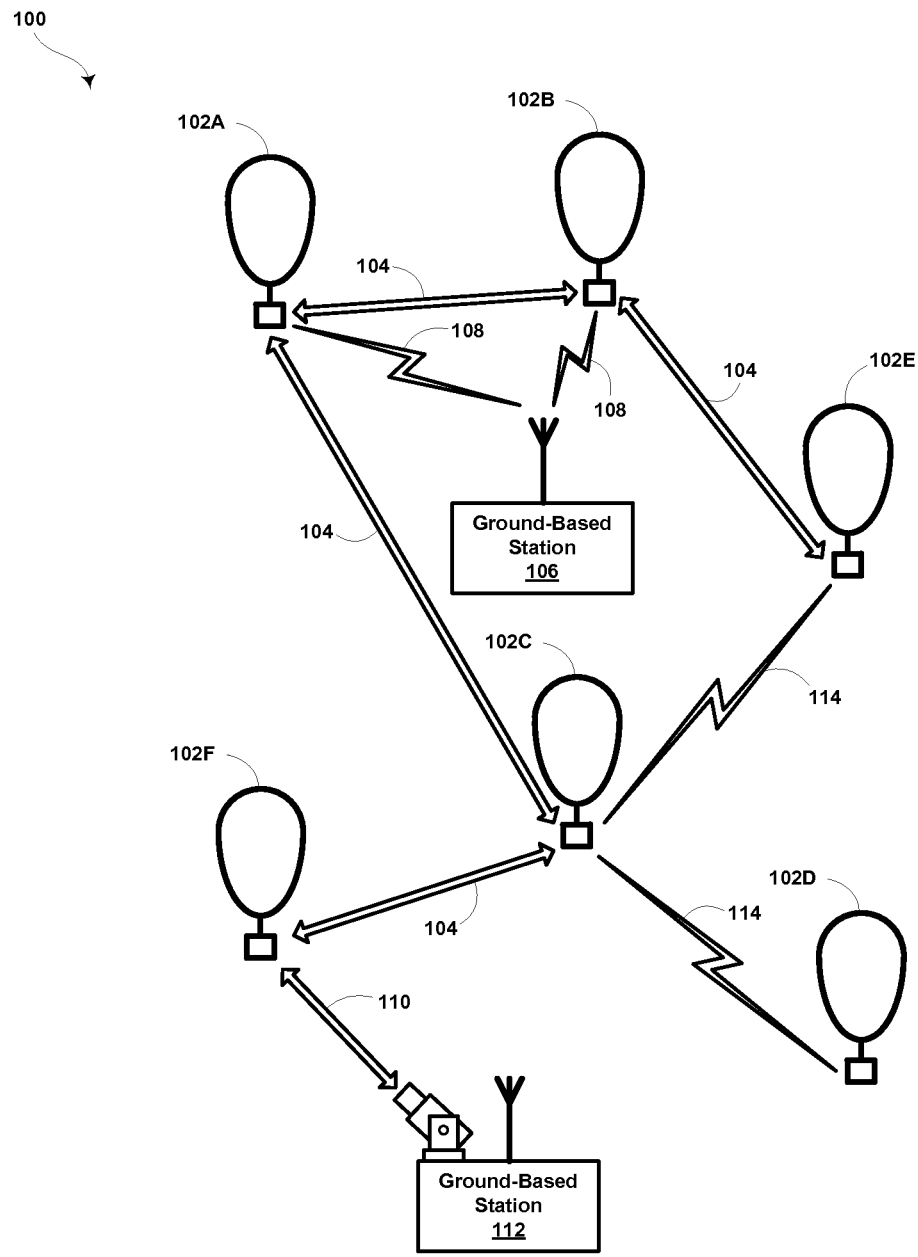
FIG. 1 is a simplified block diagram illustrating a balloon network, according to an example embodiment.

Example apparatus are described herein. Any example embodiment or feature described herein is not necessarily to be construed as preferred or advantageous over other embodiments or features. The example embodiments described herein are not meant to be limiting. It will be readily understood that certain aspects of the disclosed apparatus can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

I. Overview

Illustrative embodiments help to provide a data network that includes a plurality of balloons; for example, a mesh network formed by high-altitude balloons deployed in the stratosphere. Since winds in the stratosphere may affect the locations of the balloons in a differential manner, each balloon in an example network may be configured to change its horizontal position by adjusting its vertical position (i.e., altitude). For instance, by adjusting its altitude, a balloon may be able find winds that will carry it horizontally (e.g., latitudinally and/or longitudinally) to a desired horizontal location.

Further, in an example balloon network, the balloons may communicate with one another using free-space optical communications. For example, balloon-to-balloon free-space optical links may be implemented using lasers. As another example, balloons may be configured for optical communications using ultra-bright LEDs (which are also referred to as "high-power" or "high-output" LEDs). In addition, the balloons may communicate with ground-based station(s) using radio-frequency (RF) communications.

In the context of a balloon network, embodiments described herein may generally help to transmit free-space optical signals to balloons at long distances (e.g., more than several kilometers); for example by expanding a beam of the free-space optical signal. (Of course, example embodiments may also be used to transmit over longer or shorter distances.) Beneficially, embodiments described herein may help to reduce the weight and/or space of an optical transmitter on a balloon without sacrificing other performance aspects of the optical transmitter. Any weight and/or space reduction may lead to less power consumption; for example less energy may be needed to maneuver the balloon. And embodiments described herein may be reproducible in a large volume.

For example, an illustrative balloon may include a light source, a first feature comprising a diffractive element and a reflective element and a second feature that is substantially aligned with the first feature. The light source could be a laser. The diffractive element could be substantially aligned with the light source to receive the optical signal. And the first feature could be located between the light source and the second feature. For instance, an optical signal, such as a collimated laser beam, emitted from the light source may be divided into portion(s) and some portions are reflected between the second and first features. Such reflection may be referred to as beam folding (and arrangements for such reflection may be referred to as origami lenses).

In a further aspect, the second feature also transmits other portions of the optical signal to a destination balloon. In an illustrative implementation, the portions of the optical signal that are transmitted to the destination balloon may collectively form a beam that could be a shape of a graded series of ring(s) (rather than a shape of a toroid). As a result, more power of the optical signal can be concentrated towards a center of the beam. In an illustrative implementation, a beam profile of the transmitted optical signal may be tuned by changing a distance between the first and second features, a dimension of the diffractive element, and/or a ratio of reflection/transmission of the second feature.

II. Balloon Data Networks

In some embodiments, a high-altitude-balloon network may be homogenous. That is, the balloons in a high-altitude-balloon network could be substantially similar to each other in one or more ways. More specifically, in a homogenous high-altitude-balloon network, each balloon is configured to communicate with nearby balloons via free-space optical links. Further, some or all of the balloons in such a network, may also be configured to communicate with ground-based station(s) using RF communications. (Note that in some embodiments, the balloons may be homogenous in so far as each balloon is configured for free-space optical communication with other balloons, but heterogeneous with regard to RF communications with ground-based stations.)

In other embodiments, a high-altitude-balloon network may be heterogeneous, and thus may include two or more different types of balloons. For example, some balloons may be configured as super-nodes, while other balloons may be configured as sub-nodes. Some balloons may be configured to function as both a super-node and a sub-node. Such balloons may function as either a super-node or a sub-node at a particular time, or, alternatively, act as both simultaneously depending on the context. For instance, an example balloon could aggregate search requests of a first type to transmit to a ground-based station. The example balloon could also send search requests of a second type to another balloon, which could act as a super-node in that context.

In such a configuration, the super-node balloons may be configured to communicate with nearby super-node balloons via free-space optical links. However, the sub-node balloons may not be configured for free-space optical communication, and may instead be configured for some other type of communication, such as RF communications. In that case, a super-node may be further configured to communicate with sub-nodes using RF communications. Thus, the sub-nodes may relay communications between the super-nodes and one or more ground-based stations using RF communications. In this way, the super-nodes may collectively function as backhaul for the balloon network, while the sub-nodes function to relay communications from the super-nodes to ground-based stations. Other differences could be present between balloons in a heterogeneous balloon network.

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, balloons 102A to 102F may be configured for RF communications with ground-based stations 106 and 112 via RF links 108. In another example embodiment, balloons 102A to 102F could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has lower winds (e.g., between 5 and 20 miles per hour (mph)).

More specifically, in a high-altitude-balloon network, balloons 102A to 102F may generally be configured to operate at altitudes between 17 km and 25 km (although other altitudes are possible). This altitude range may be advantageous for several reasons. In particular, this layer of the stratosphere generally has mild wind and turbulence (e.g., winds between 5 and 20 miles per hour (mph)). Further, while the winds between 17 km and 25 km may vary with latitude and by season, the variations can be modeled in a reasonably accurate manner. Additionally, altitudes above 17 km are typically above the maximum flight level designated for commercial air traffic. Therefore, interference with commercial flights is not a concern when balloons are deployed between 17 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication ground-based stations 106 and 112 via RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-to-ground RF communication, among other possibilities.

In a further aspect, there may scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F could be configured as a downlink balloon. Like other balloons in an example network, a downlink balloon 102F may be operable for optical communication with other balloons via optical links 104. However, downlink balloon 102F may also be configured for free-space optical communication with a ground-based station 112 via an optical link 110. Optical link 110 may therefore serve as a high-capacity link (as compared to an RF link 108) between the balloon network 100 and a ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which provides an RF link with substantially the same capacity as the optical links 104. Other forms are also possible.

Balloons could be configured to establish a communication link with space-based satellites in addition to, or as an alternative to, a ground-based communication link.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point with which various devices can connect to balloon network 100. Ground-based stations 106 and 112 may have other configurations and/or serve other purposes without departing from the scope of this disclosure.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

A. Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon network, the balloons may include components for physical switching that is entirely optical, without any electrical switching involved in physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular Quality of Service (QoS) may be employed when determining a lightpath. Other techniques are also possible.

B. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100. The term "substantially the same," as used in this disclosure refers to exactly the same and/or one or more deviations from exactly the same that do not significantly impact transmission optical signals as described herein.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function. The given balloon may then determine appropriate actions to take in order to effectuate the desired movement. For example, a balloon may determine an altitude adjustment or adjustments such that winds will move the balloon in the desired manner.

C. Control of Balloons in a Balloon Network

Figure 2:
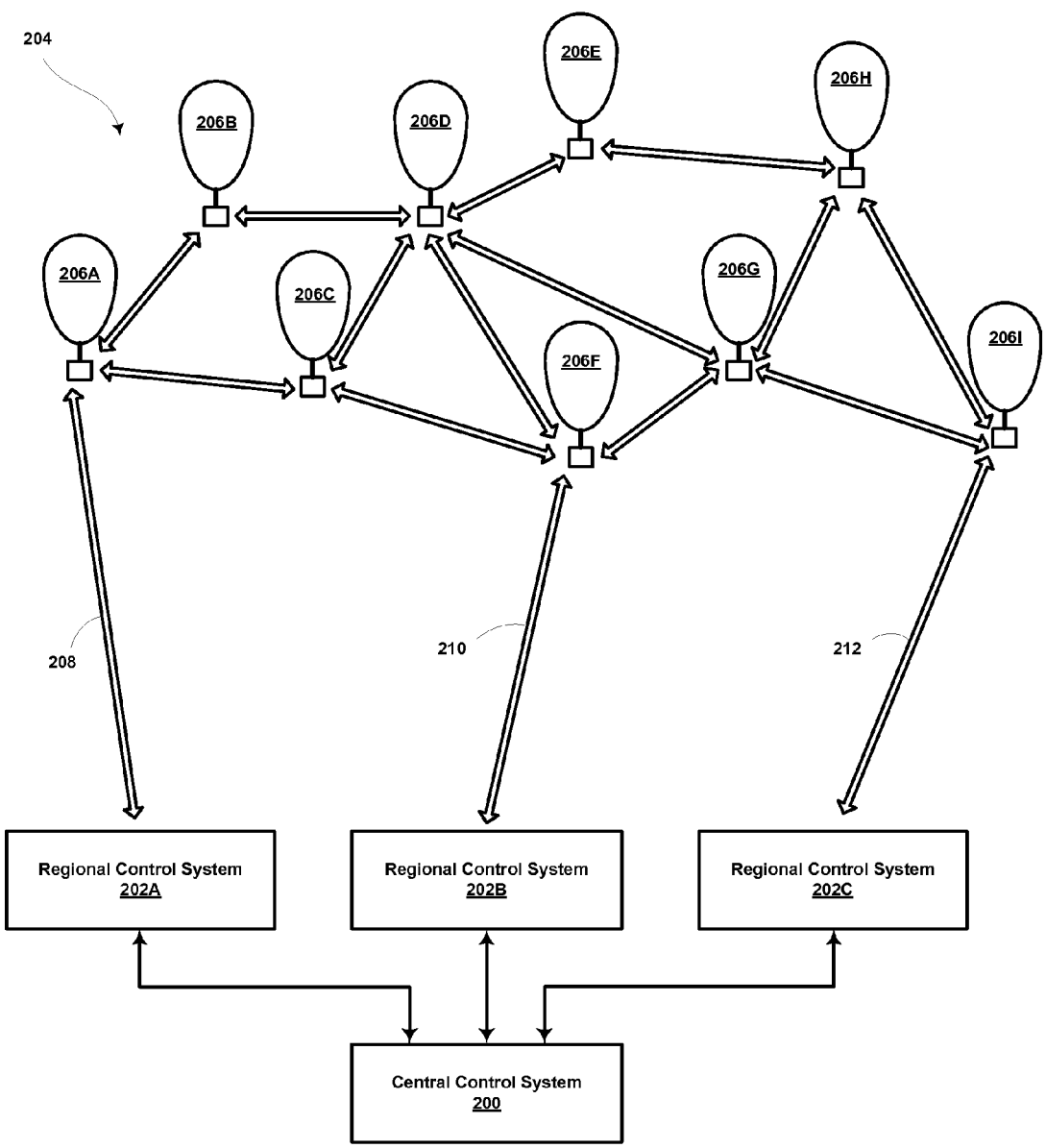
FIG. 2 is a block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202C. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 208, 210, and 212, respectively.

In the illustrated configuration, where only some of balloons 206A to 206I are configured as downlink balloons, the balloons 206A, 206F, and 206I that are configured as downlink balloons may function to relay communications from central control system 200 to other balloons in the balloon network, such as balloons 206B to 206E, 206G, and 206H. However, it should be understood that it in some implementations, it is possible that all balloons may function as downlink balloons. Further, while FIG. 2 shows multiple balloons configured as downlink balloons, it is also possible for a balloon network to include only one downlink balloon.

Note that a regional control system 202A to 202C may in fact just be particular type of ground-based station that is configured to communicate with downlink balloons (e.g. the ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. A distributed-control arrangement may be useful in other scenarios as well.

Further, it should be understood that other control-system arrangements are possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared between a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_I$, wherein $d_I$ is proportional to the distance to the second nearest neighbor balloon, for instance.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

III. Illustrative Balloon Configurations

Figure 3:
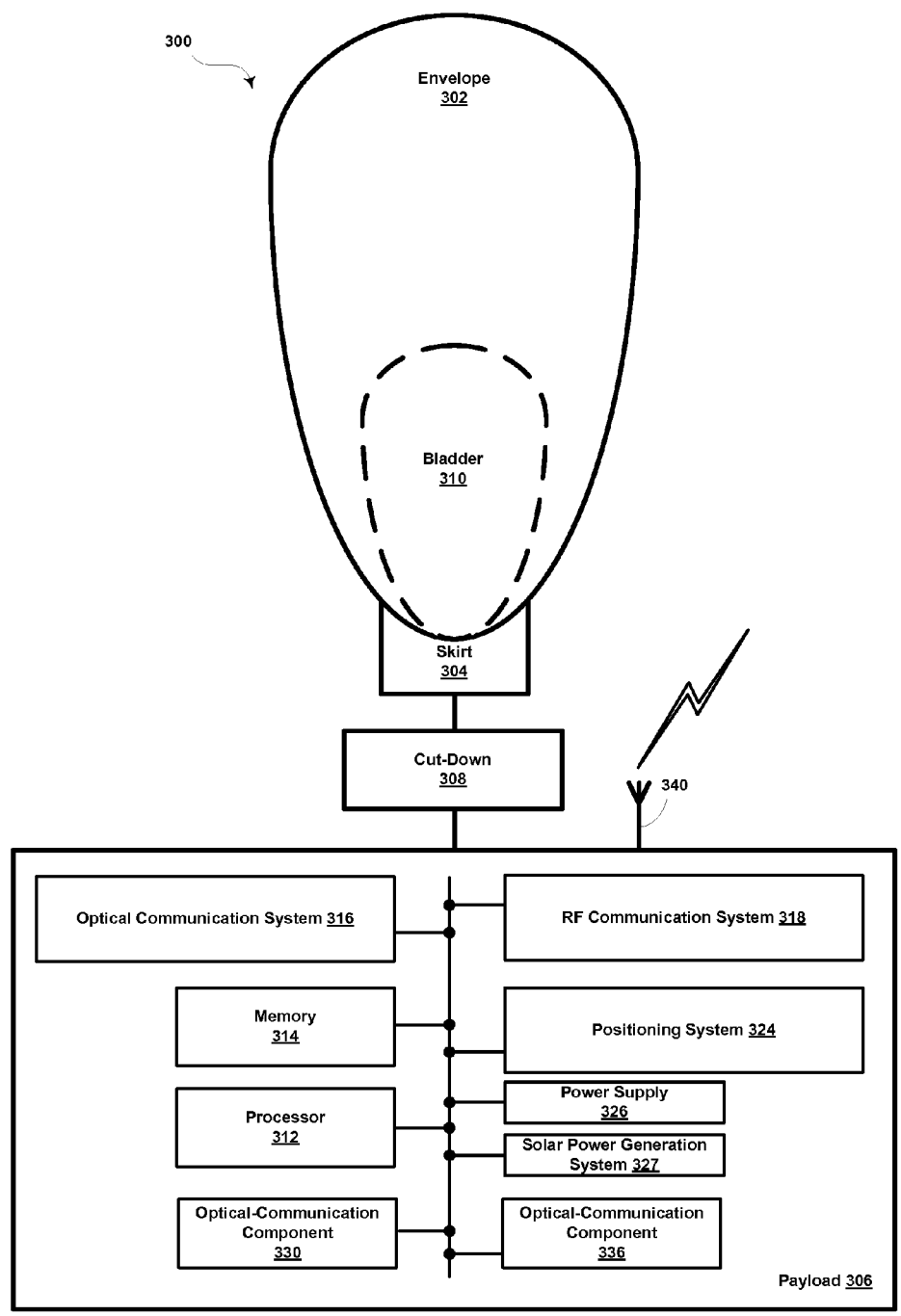
FIG. 3 is a simplified block diagram illustrating a high-altitude balloon, according to an example embodiment

Various types of balloon systems may be incorporated in an example balloon network. As noted above, an example embodiment may utilize high-altitude balloons, which could typically operate in an altitude range between 17 km and 25 km. FIG. 3 shows a high-altitude balloon 300, according to an example embodiment. As shown, the balloon 300 includes an envelope 302, a skirt 304, a payload 306, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of a highly-flexible latex material or may be made of a rubber material such as chloroprene. In one example embodiment, the envelope and/or skirt could be made of metalized Mylar or BoPet. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The memory 314 may have instructions stored thereon, which can be accessed and executed by the processor 312 in order to carry out the balloon functions described herein. Further, the processor 312, in conjunction with program instructions stored in memory 314, and/or other components, may function as a control system of balloon.

The payload 306 of balloon 300 may also include various other types of equipment and systems to provide a number of different functions. For example, the payload 306 may also include an optical communication system 316, which may control transmission and/or reception of optical signals to and/or from other balloons. Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be an element of balloon 300. Thus, in various contemplated embodiments, altitude control of balloon 300 could be achieved, at least in part, by adjusting the rotation of the balloon with respect to the sun.

Further, a balloon 306 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

As noted, balloon 300 may include an optical communication system 316 for free-space optical communication with other balloons. As such, optical communication system 316 may be configured to transmit a free-space optical signal by modulating a laser or ultra-bright LED system. The optical communication system 316 may be implemented with mechanical systems and/or with hardware, firmware, and/or software. Generally, the manner in which an optical communication system is implemented may vary, depending upon the particular application.

In the illustrated example, optical communication system 316 is configured to operate optical-communication components 330 and 336. Within the context of this disclosure, the optical-communication components 330 and 336 may include an optical transmitter, an optical receiver, and/or an optical transceiver.

Note that the location of optical-communication components on the payload 306, optical-communication components 330 and 336, may vary. Further, various different electronic and/or mechanical systems, such as one or more gimble mounts, may be used to position optical-communication components by e.g., changing a pointing direction and/or changing a location of an optical-communication component on the payload 306.

Further, optical-communication component 330 may be configured to maintain an optical link with a first neighboring balloon while optical-communication component 336 may be configured to maintain an optical link with a second neighboring balloon or a ground-based station. In other words, one or more optical-communication components could be used with respective pointing mechanisms in an effort to maintain optical links with one or more ground-, air-, or space-based network nodes.

IV. Illustrative Transmission of Optical Signals

Figure 4:
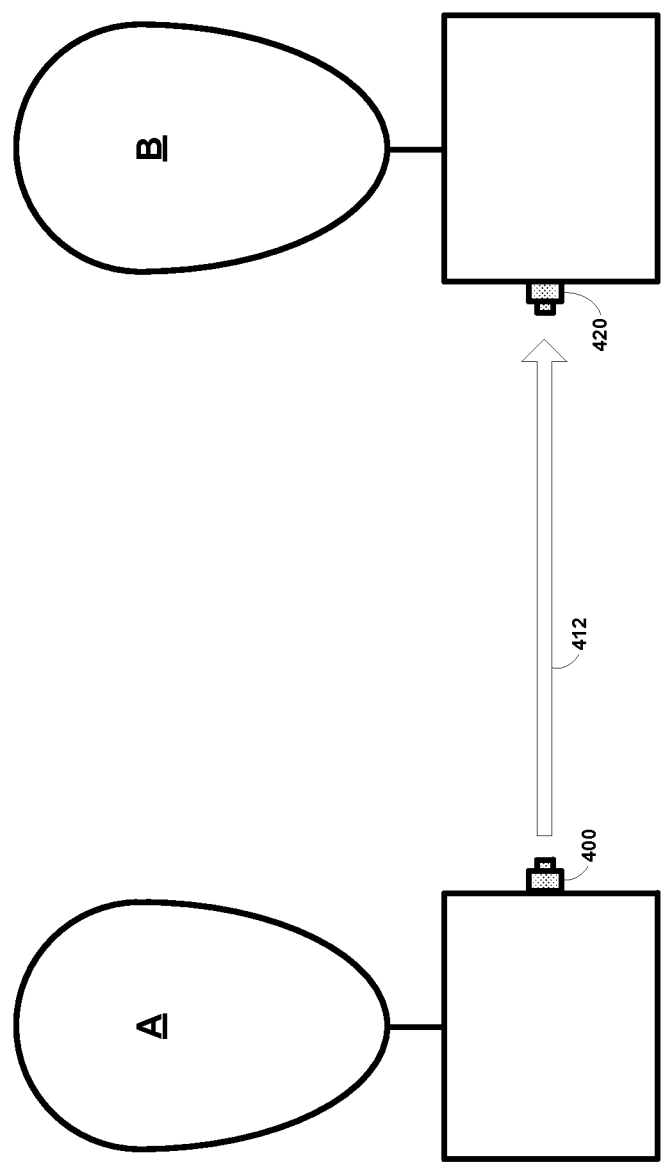
FIG. 4 is block diagram illustrating a scenario in which a balloon transmits an optical signal to another balloon, according to an example embodiment.

FIG. 4 is block diagram illustrating a scenario in which a balloon A transmits an optical signal to another balloon B, according to an example embodiment. Balloons A and B could each include one or more optical-communication components, such as an optical transmitter, an optical receiver, and/or an optical transceiver. Specifically, in the illustrated example, balloon A may include an optical transmitter 400 (e.g., a transmitter employing lasers and/or LEDS) that uses beamforming to transmit an optical signal 412. Since the optical signal 412 is a beam, balloon B may be configured to substantially align its optical receiver 420 with the optical transmitter 400 on balloon A, in order to receive and understand the optical signal 412.

Figure 5:
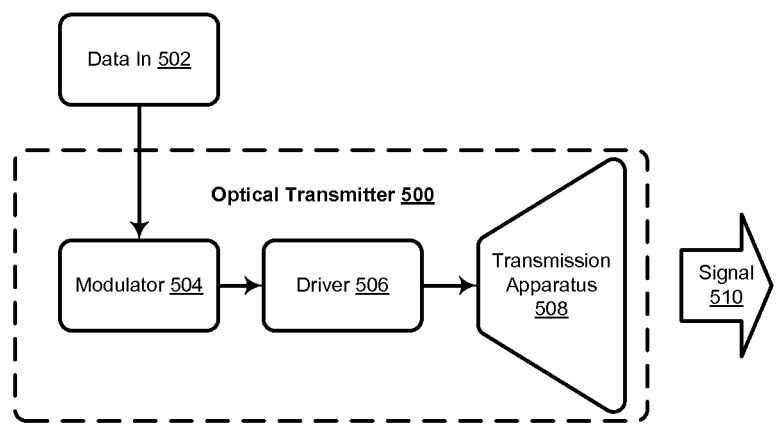
FIG. 5 is a block diagram showing an optical transmitter, according to an illustrative configuration.

FIG. 5 is a simplified block diagram showing an optical transmitter 500, according to an illustrative configuration. In some embodiments, the optical transmitter 400 could take the form of or be similar in form to the optical transmitter 500.

The optical transmitter 500 could receive data in 502 that could be in the form of electrical and/or optical signals. The electrical and/or optical signals that comprise the data in 502 may include information in the form of one or more digital or analog voltage and/or optical intensity level(s). The data in 502 could be received by the optical transmitter 500 via an electrical (e.g., wire or multi-conductor cable) or optical (e.g., optical fiber or waveguide) connection. Modulator 504 could encode the information from the data in 502 using one or more encoding techniques, such as intensity modulation, phase modulation, pulse-wave modulation, and/or frequency modulation. Those skilled in the art will understand that modulator 504 could reasonably use other known encoding schemes. A driver 506 may convert the encoded information into a driving signal that could be used by a transmission apparatus 508. For example, the driving signal may act to illuminate one or more elements of the transmission apparatus 508.

Depending upon the embodiment, one or more elements of the transmission apparatus 508 could be configured in different ways in an effort to efficiently transmit output light as a free-space optical signal, such as signal 510, to a destination or correspondent balloon. For instance, the transmission apparatus 508 could be configured to provide an optical-communications link over several kilometers. In other embodiments, the transmission apparatus 508 could be configured differently in order to establish an optical-communications link with a ground-based station or a space-based platform. For instance, the configuration of optical elements in the transmission apparatus 508 could be different if the intended target was a ground-based station (15-30 km away) compared to if the intended target was a space-based platform (geosynchronous orbits can be over 42,000 km). Therefore, the distance between the balloon and a space-based target could be over 42,000 km away. Accordingly, the optical elements in the transmission apparatus 508 could be adjusted (e.g., by using a zoom and/or focusing feature of a telescope). In other embodiments, separate sets of transmission apparatus 508 could be used based upon, for instance, the distance to an intended destination and/or an altitude of an intended destination.

Figure 6:
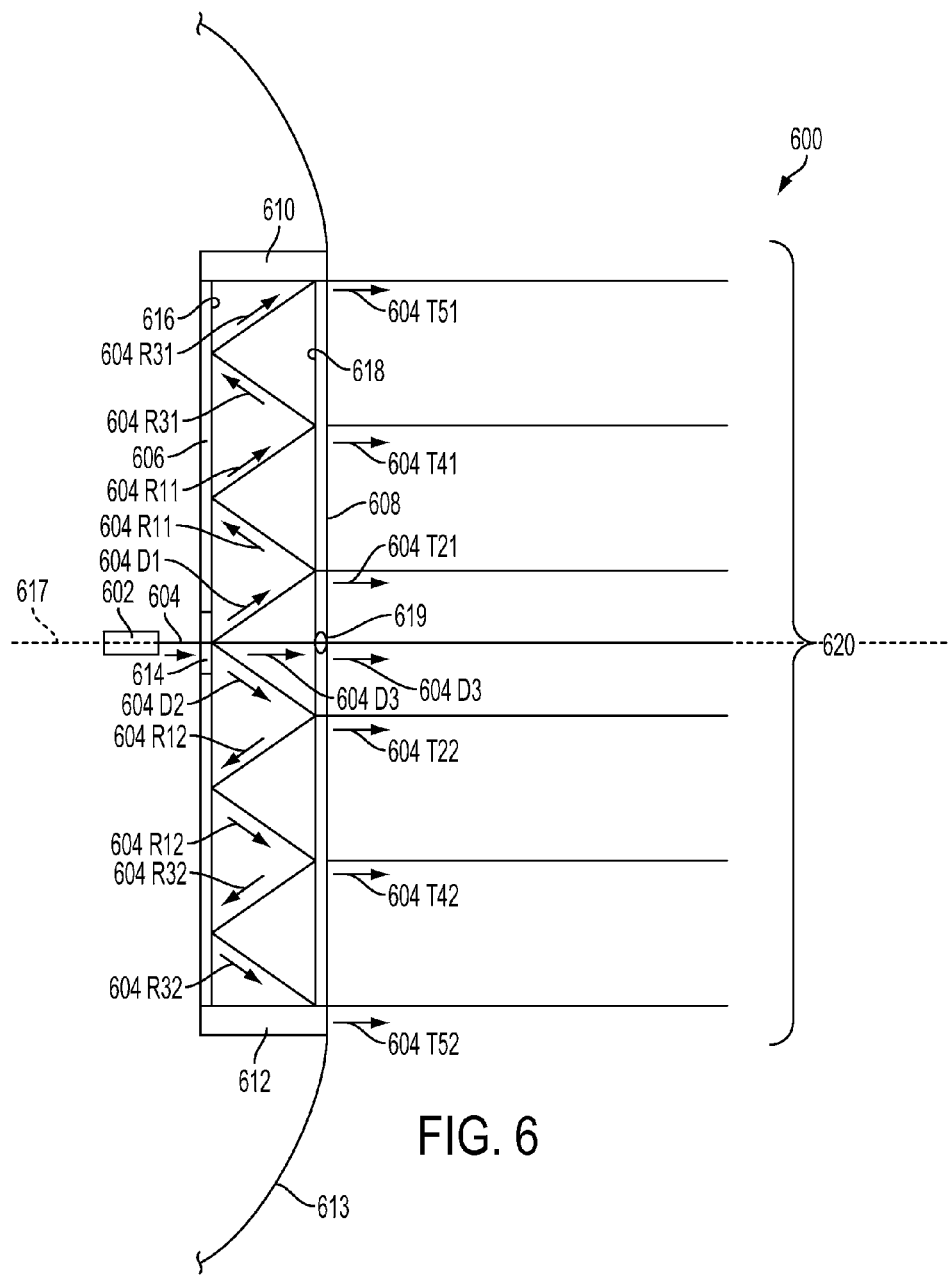
FIG. 6 depicts a transmission apparatus, according to an example embodiment.

FIG. 6 depicts transmission apparatus 600, according to an example embodiment. In particular, the transmission apparatus 600 may include a light source 602 configured to emit an optical signal 604 having a first dimension, a first feature 606, and a second feature 608. As shown in FIG. 6, the first feature 606 is located between the light source 602 and the second feature 608. And as shown in FIG. 6, the second feature 608 is substantially aligned with the first feature 606. In an example embodiment, the second feature 608 could be substantially parallel to the first feature 606. Other entities could be present in addition to and/or instead of one or more entities depicted in FIG. 6, as this arrangement is presented by way of example. And other variations are possible as well.

The first feature 606 and the second feature 608 may each be attached to a first spacer 610 and a second spacer 612. The first spacer 610 and the second spacer 612 could be any suitable arrangement of component(s) to maintain a predetermined distance between the first feature 606 and the second feature 608.

The second feature 608 may be connected to an envelope 613. The envelope 613 could take the form of or be similar in form to the envelope 302.

FIG. 6 depicts a side view of the transmission apparatus 600. In some embodiments, the transmission apparatus 600 could be arranged such that a top view of the transmission apparatus 600 may be similar to the side view.

The first feature 606 may include a diffractive element 614 and a reflective element 616. As shown in FIG. 6, the diffractive element 614 is substantially aligned with the light source 602 to receive the optical signal 604. And as shown in FIG. 6, the diffractive element 614 is located on an optical axis 617 of the light source 602. The second feature 608 may include an inner surface 618 that is partially reflective and partially transmissive.

The light source 602, the first feature 606, and the second feature 608 may be arranged, such that the optical signal 604 having the first dimension is diffracted by the diffractive element 614 and is expanded to a beam 620 having a second dimension and transmitted to a destination balloon (e.g., balloon B as shown in FIG. 4) based on reflection of the diffracted optical signal by the reflective element 616 and partial reflection and partial transmission of the diffracted optical signal by the second feature 618.

In the illustrated example, the diffracted optical signal is shown as comprising three rays, 604D1, 604D2, and 604D3. However, in other examples, the diffracted optical signal may comprise less or more than three rays.

More specifically, the diffractive element 614 is configured to diffract the optical signal 604; the second feature 608 is configured to (a) reflect a first portion 604R11, 604R12 of the diffracted optical signal and (b) transmit a second portion 604T21, 604T22 of the diffracted optical signal; the reflective element 616 is configured to reflect the first portion 604R11, 604R12 of the diffracted optical signal to the second feature 608; and the second feature 608 is further configured to transmit at least part of the first portion 604T41, 604T42 of the diffracted optical signal to the destination balloon. As shown in FIG. 6, the second feature 608 reflects the first portion 604R11, 604R12 of the diffracted signal to the reflective element 616.

Moreover, the second feature 608 is further configured to reflect at least part of the first portion 604R31, 604R32 of the diffracted optical, and the reflective element 616 is further configured to reflect the at least part of the first portion 604R31, 604R32 of the diffracted optical signal. As shown in FIG. 6, the second feature 608 reflects the at least part of the first portion 604R31, 604R32 to the reflective element 616. And as shown in FIG. 6, the reflective element 616 reflects the at least part of the first portion 604R31, 604R32 to the second feature 608. Furthermore, the second feature 608 is further configured to transmit a second part of the first portion 604T51, 604T52 of the diffracted optical signal to the destination balloon.

In the illustrated example, the first portion of the diffracted optical signal that is reflected by the second feature 608 and/or the reflective element 616 is shown as comprising two rays, 604R11 and 604R12; the second portion of the diffracted optical signal that is transmitted by the second feature 608 is shown as comprising two rays, 604T21 and 604T22; the at least part of the first portion of the diffracted optical signal that is transmitted by the second feature 608 is shown as comprising two rays, 604T41 and 604T42; the at least part of the first portion of the diffracted optical signal that is reflected by the second feature 608 and/or the reflective element 616 is shown as comprising two rays, 604R31 and 604R32; and the second part of the first portion of the diffracted optical signal that is transmitted by the second feature 608 is shown as comprising two rays, 604T51 and 604T52.

However, in other examples, the first portion of the diffracted optical signal that is reflected by the second feature 608 and/or the reflective element 616 may comprise less or more than two rays, the second portion of the diffracted optical signal that is transmitted by the second feature 608 may comprise less or more than two rays, the at least part of the first portion of the diffracted optical signal that is transmitted by the second feature 608 may comprise less or more than two rays, the at least part of the first portion of the diffracted optical signal that is reflected by the second feature 608 and/or the reflective element 616 may comprise less or more than two rays, and the second part of the first portion of the diffracted optical signal that is transmitted by the second feature 608 may comprise less or more than two rays.

In addition, the second feature 608 may include an aperture 619. With this arrangement, at least part of the diffracted optical signal (e.g., 604D3) is transmitted to the destination balloon through the aperture 619. As shown in FIG. 6, the aperture 619 is located on the optical axis 617. Other locations for the aperture 619 are possible as well.

The beam 620 could take various different forms in various different embodiments. For instance, in the illustrated example, the beam 620 is shown as comprising seven rays, 604T21, 604T22, 604T41, 604T42, 604T51, 604T52, and 604D3. With this arrangement, the beam 620 may take the form of a graded series of rings. However, in other examples, the beam 620 may comprise less or more than seven rays.

In an illustrative implementation, the second dimension (e.g., diameter) of the beam 620 may be selected based on a distance between the transmission apparatus 600 and the destination balloon. In some embodiments, the second dimension may increase as the distance between the transmission apparatus 600 and the destination balloon increases.

With this arrangement, divergence of the beam 620 (e.g., natural divergence) may be reduced.

In the illustrated example, the optical axis 617 is located between the rays 604D1, 604R11, 604T21, 604R31, 604T41, and 604T51 and the rays 604D2, 604R12, 604T22, 604R32, 604T42, and 604T52. And in the illustrated example, the ray 604D3 is located along the optical axis 617. However, in other examples, the optical axis 617 may not be located between the rays 604D1, 604R11, 604T21, 604R31, 604T41, and 604T51 and the rays 604D2, 604R12, 604T22, 604R32, 604T42, and 604T52.

Moreover, in the illustrated example, a direction of the ray 604D1 is opposite to a direction of the 604D2; a direction of the ray 604R11 is opposite to a direction of the 604R12; and a direction of the ray 604R31 is opposite to a direction of the 604R32. However, in other examples, a direction of the ray 604D1 may not be opposite to a direction of the 604D2; a direction of the ray 604R11 may not be opposite to a direction of the 604R12; and a direction of the ray 604R31 may not be opposite to a direction of the 604R32.

The light source 602 could take various different forms in various different embodiments. In an example embodiment, light source 602 could represent one or more lasers or light-emitting diodes (LED). The light source 602 could also include other high-power light sources known in the art. The emission wavelengths of light source 602 could be in the ultraviolet (UV), visible, infrared and microwave spectral regimes. The wavelength band of emission could be relatively narrow (e.g., a few nanometers in spectral width). Alternatively, the wavelength band could be broadband (e.g., a large portion of visible spectrum, as is common in 'white' LED emission). Further, light source 602 could be configured to emit light at multiple discrete wavelengths (e.g., with a two-color laser) or within multiple wavebands (e.g., with a multi-color LED).

The light source 602 could be configured to modulate (e.g., turn on and off) at high frequencies in order to achieve more than 10 gigabit-per-second (GBit/s) data throughput. The optical signal 604 emitted from the light source 602 could be either collimated or uncollimated. Further, the intensity of the optical signal 604 could be adjustable.

In an alternative embodiment, light emitted from the light source 602 could be modulated by a modulator. For instance, a polarization modulator could be configured to modulate the polarization of the light emitted from the light source 602. In such a scenario, the free-space optical signal could include data based, at least in part, on the polarization of light. Various modulator types are possible, including a liquid-crystal modulator and a spatial light modulator, among others. In practice, the free-space optical signal could include more than one type of light modulation. Further, the light modulation could be performed at high frequencies to achieve more than 10 GBit/s data transmission.

The first feature 606 and the second feature 608 could take various different forms in various different embodiments. In an example embodiment, the first feature 606 and the second feature 608 could be one or more entities selected from the group consisting of a mirror and a lens. Moreover, in an example embodiment, the first feature 606 and the second feature 608 could be one or more materials selected from the group consisting of plastic, glass, and metal. For example, the first feature 606 and the second feature 608 could be metalized Mylar or BoPet.

As shown in FIG. 6, the first feature 606 and the second feature 608 are substantially flat. In such an example, the beam 620 may be collimated based on the second feature 608 and one or more diffractives. With this arrangement, size and/or complexity of the transmission apparatus 600 may be reduced. The term "substantially flat," as used in this disclosure, refers to exactly flat and/or one or more deviations from exactly flat that do not significantly impact transmission of an optical signal as described herein.

However, in other embodiments, the first feature 606 and/or the second feature 608 could include a curved surface. And in some embodiments, the second feature 608 could comprise a portion of the envelope 613.

The diffractive element 614 could take various different forms in various different embodiments. In an example embodiment, the diffractive element 614 could be a grating, such as a circular grating, a fan-out grating, and/or a beam splitter. And in at least one such embodiment, one or more parameters of the grating could be selected based on light emitted from the light source 602, a distance between the transmission apparatus 600 and the destination balloon, and/or an altitude of the destination balloon. For example, a grating period, a groove height, a groove angle, and/or a refractive index of the grating could be selected based on light emitted from the light source 602, the distance between the transmission apparatus 600 and the destination balloon, and/or the altitude of the destination balloon.

The inner surface 618 of the second feature 608 could take various different forms in various different embodiments. In an example embodiment, the inner surface 618 could include a microstructure that is partially reflective and partially transmissive, such that the second feature 608 reflects the first portion 604R11, 604R12 of the diffracted optical signal; transmits the second portion 604T21, 604T22 of the diffracted optical signal to the destination balloon; and transmits the at least part of the first portion 604T41, 604T42 of the diffracted optical signal to the destination balloon.

In other examples, the microstructure could be further arranged, such that the second feature 608 reflects the at least part of the first portion 604R31, 604R32 of the diffracted optical signal. Moreover, in other examples, the microstructure could further arranged, such that the second feature 608 transmits the second part of the first portion 604T51, 604T52 of the diffracted optical signal to the destination balloon.

The microstructure could be formed on the inner surface 618 in a variety of ways, such as by machining, lithography, and/or embossing techniques. For example, the microstructure could be formed on the inner surface 618 by diamond turning, etching, roll-to-roll embossing, plate-to-plate embossing, hot embossing and/or UV embossing, etc.

Moreover, in at least one such embodiment, one or more parameters of the microstructure could be selected based on light emitted from the light source 602, a distance between the transmission apparatus 600 and the destination balloon and/or an altitude of the destination balloon. For example, a grating period, a groove height, a groove angle, and/or a refractive index of the microstructure could be selected based on light emitted from the light source 602, a distance between the transmission apparatus 600 and the destination balloon, and/or an altitude of the destination balloon.

In another embodiment, the inner surface 618 could include a coating that is partially reflective and partially transmissive, such that the second feature 608 reflects the first portion 604R11, 604R12 of the diffracted optical signal; transmits the second portion 604T21, 604T22 of the diffracted optical signal to the destination balloon; and transmits the at least part of the first portion 604T41, 604T42 of the diffracted optical signal to the destination balloon.

In other examples, the coating could be further arranged, such that the second feature 608 reflects the at least part of the first portion 604R31, 604R32 of the diffracted optical signal. Moreover, in other examples, the coating could further arranged, such that the second feature 608 transmits the second part of the first portion 604T51, 604T52 of the diffracted optical signal to the destination balloon.

The coating could be a variety of materials, such as metal and/or dichroic. For example, the coating could include aluminium and/or chromium. Moreover, in at least one such embodiment, one or more parameters of the coating could be selected based on light emitted from the light source 602, a distance between the transmission apparatus 600 and the destination balloon and/or an altitude of the destination balloon. For example, a thickness of the coating and/or a surface finish of the coating could be selected based on light emitted from the light source 602, a distance between the transmission apparatus 600 and the destination balloon and/or an altitude of the destination balloon.

In yet another embodiment, the inner surface 618 could include a microstructure and a coating as described herein arranged such that the inner surface 618 is partially reflective and partially transmissive. With this arrangement, the second feature 608 reflects the first portion 604R11, 604R12 of the diffracted optical signal; transmits the second portion 604T21, 604T22 of the diffracted optical signal to the destination balloon; and transmits the at least part of the first portion 604T41, 604T42 of the diffracted optical signal to the destination balloon.

In other examples, the microstructure and coating could be further arranged, such that the second feature 608 reflects the at least part of the first portion 604R31, 604R32 of the diffracted optical signal. Moreover, in other examples, the microstructure and coating could be further arranged, such that the second feature 608 transmits the second part of the first portion 604T51, 604T52 of the diffracted optical signal to the destination balloon.

Moreover, in at least one such embodiment, one or more parameters of the microstructure and/or the coating could be selected based on light emitted from the light source 602, a distance between the transmission apparatus 600 and the destination balloon, and/or an altitude of the destination balloon.

As noted, the second feature 608 reflects the first portion 604R11, 604R12 of the diffracted optical signal and transmits the second portion 604T21, 604T22 of the diffracted optical signal to the destination balloon. In an example embodiment, the first portion 604R11, 604R12 of the diffracted optical signal could comprise a first percentage of the incident diffracted optical signal, and the second portion 604T21, 604T22 of the diffracted optical signal could comprise a second percentage of the incident diffracted optical signal. And in at least one such embodiment, the first percentage could be between 90% to 95% of the incident diffracted optical signal, and the second percentage could be between 10% to 5% of the incident diffracted optical signal (which may be referred to as leaky and/or weakly leaky).

As noted, the reflective element 616 reflects the first portion 604R11, 604R12 to the second feature 608. In an example embodiment, the reflective element 616 may reflect substantially all of the first portion 604R11, 604R12 to the second feature 608. The term "substantially all," as used in this disclosure, refers to exactly all and/or one or more deviations from exactly all that do not significantly impact transmission of an optical signal as described herein.

In an example embodiment, the inner surface 618 may include a coating and/or microstructure that is substantially the same across the second feature 608. With this arrangement, a first percentage of the incident diffracted optical signal transmitted by the second feature 608 (and correspondingly a second percentage of the incident diffracted optical signal reflected by the second feature 608) could be substantially the same across the second feature 608.

In another example embodiment, a first percentage of the incident diffracted optical signal transmitted by the second feature 608 (and correspondingly a second percentage of the incident diffracted optical signal reflected by the second feature 608) may vary based on a distance from the optical axis 617. For example, the first percentage of the incident the diffracted optical signal transmitted by the second feature 608 may increase as the distance from the optical axis 617 increases. As a result, the second percentage of the incident diffracted optical signal reflected by the inner surface 618 may decrease as the distance from the optical axis 617 increases.

For instance, as noted above, in an example embodiment, the first portion 604R11, 604R12 of the diffracted optical signal could comprise a first percentage of the incident diffracted optical signal, and the second portion 604T21, 604T22 of the diffracted optical signal could comprise a second percentage of the incident diffracted optical signal. And in at least one such embodiment, the first percentage could be between 90% to 95% of the incident diffracted optical signal, and the second percentage could be between 10% to 5% of the incident diffracted optical signal.

Moreover, in such an example, the at least part of the first portion 604R31, 604R32 of the diffracted optical signal could comprise a first percentage of the incident diffracted optical signal, and the at least part of the first portion 604T41, 604T42 of the diffracted optical signal could comprise a second percentage of the incident diffracted optical signal. And in at least one such embodiment, the first percentage could be between 88% to 89% of the incident diffracted optical signal, and the second percentage could be between 12% to 13% of the incident diffracted optical signal.

Accordingly, in such an example, the second feature 608 may transmit a first percentage of an incident portion of the diffracted optical signal to the destination balloon at a first location of the second feature, and the second feature 608 may transmit a second percentage of an incident portion of the diffracted optical signal to the destination balloon at a second location of the second feature 608.

As noted, the reflective element 616 of the first feature 606 reflects the at least part of the first portion 604R31, 604R32 to the second feature 608. In an example embodiment, the reflective element 616 of the first feature 606 may reflect substantially all of the at least part of the first portion 604R31, 604R32 to the second feature 608.

Furthermore, in an example embodiment, the second feature 608 may transmit substantially all of the second part of the first portion 604T51, 604T52 of the diffracted optical signal to the destination balloon.

And the inner surface 618 might not be partially reflective and partially reflective along substantially all of the second feature 608. As noted, the second feature 608 may include the aperture 619. As a result, the second feature 608 might not be partially transmissive and partially reflective at the aperture 619. For instance, in some embodiments, substantially all of the at least a part of the diffracted optical signal (e.g., 604D3) may be transmitted to the destination balloon through the aperture 619. As another example, the inner surface 618 may not be partially reflective and partially transmissive at one or more edges of the second feature 608. With this arrangement, substantially all of the incident diffracted optical signal (e.g., 604T51, 604T52) may be transmitted to the destination balloon at the one or more edges of the second feature 608.

Figure 7:
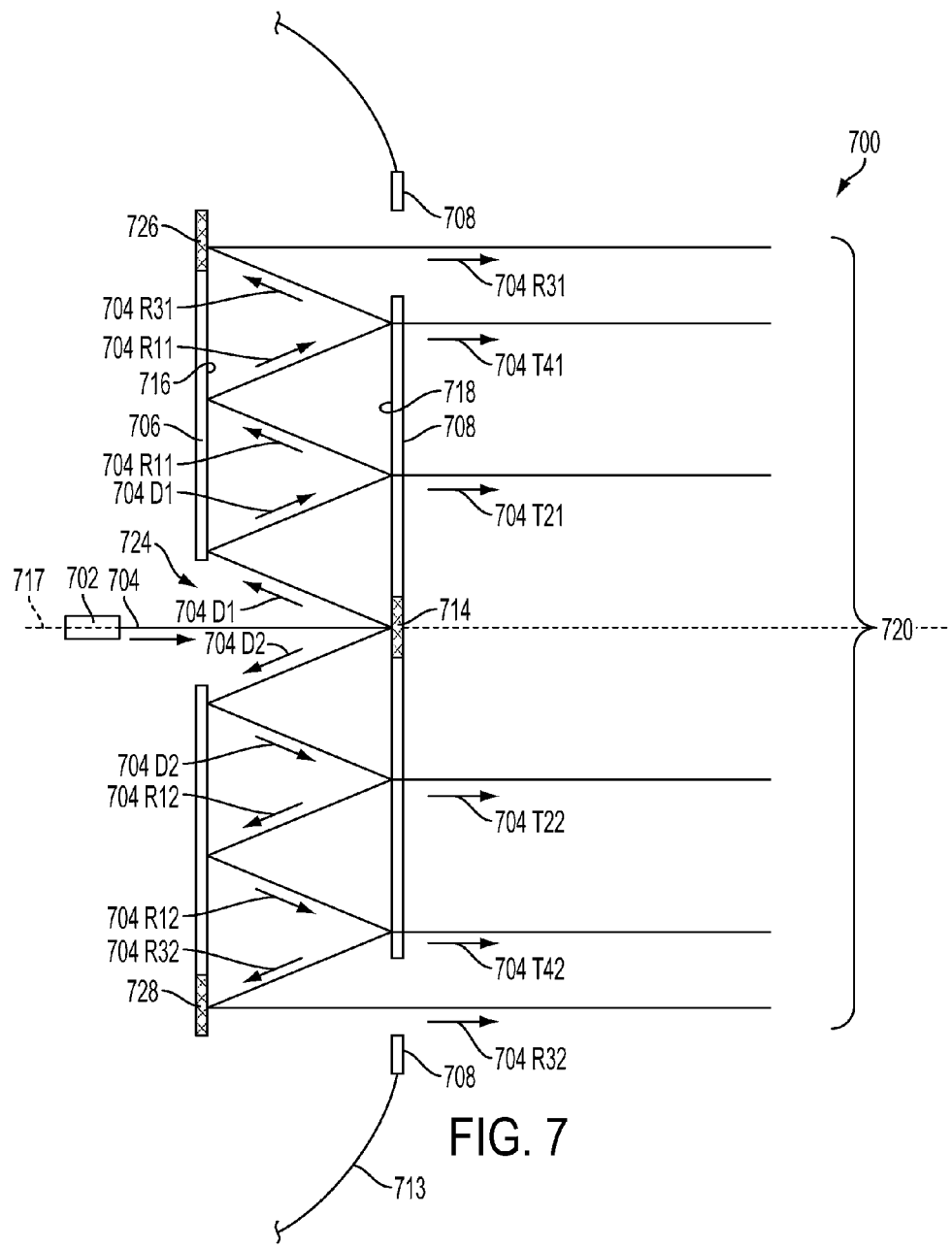
FIG. 7 depicts another transmission apparatus, according to an example embodiment.

FIG. 7 depicts another transmission apparatus 700, according to an example embodiment. In particular, the transmission apparatus 700 may include a second feature 708 having a first diffractive element 714, and a first feature 706 having an opening 724, a second diffractive element 726, and a third diffractive element 728.

More specifically, the transmission apparatus 700 may include a light source 702 configured to emit an optical signal 704 having a first dimension. As shown in FIG. 7, the first feature 706 is located between the light source 702 and the second feature 708. And as shown in FIG. 7, the second feature 708 is substantially aligned with the first feature 706.

The second feature 708 may be connected to an envelope 713. The envelope 713 could take the form of or be similar in form to the envelope 302 and/or the envelope 613.

FIG. 7 depicts a side view of the transmission apparatus 700. In some embodiments, the transmission apparatus 700 could be arranged such that a top view of the transmission apparatus 700 may be similar to the side view.

The light source 702 could take the form of or be similar in form to the light source 602; the optical signal 704 could take the form of or be similar in form to the optical signal 604; the first feature 706 could take the form of or be similar in form to the first feature 606; and the second feature 708 could take the form of or be similar in form to the second feature 608.

As noted, the first feature 706 may include the opening 724, the second diffractive element 726, and the third diffractive element 728. More specifically, the first feature 706 may include a reflective element 716. As shown in FIG. 7, the opening 724 is located on an optical axis 717 of the light source 702. Moreover, as shown in FIG. 7, the second diffractive element 726 is located at a first end of the first feature 706, and the third diffractive element 728 is located at a second end of the first feature 706.

As noted, the second feature 708 may include the first diffractive element 714. As shown in FIG. 7, the first diffractive element 714 is substantially aligned with the light source 702 to receive the optical signal 704. And as shown in FIG. 7, the first diffractive element 714 is located on the optical axis 717.

The first diffractive element 714 could take the form of or be similar in form to the diffractive element 614, the second diffractive element 726 could take the form of or be similar in form to the diffractive element 614, the third diffractive element 728 could take the form of or be similar in form to the diffractive element 614, and the optical axis 717 could take the form of or be similar in form to the optical axis 617.

Moreover, the second feature 708 may include an inner surface 718 that is partially reflective and partially transmissive. And the inner surface 718 may include a microstructure and/or a coating like the inner surface 618 may include a microstructure and/or a coating. In the illustrated example, the inner surface 718 may not have a microstructure and/or a coating at the first diffractive element 714.

The light source 702, the first feature 706, and the second feature 708 may be arranged, such that the optical signal 704 having the first dimension is diffracted by the first diffractive element 714 and is expanded to a beam 720 having a second dimension and transmitted to the destination balloon based on reflection of the diffracted optical signal by the reflective element 716 and partial reflection and partial transmission of the diffracted optical signal by the second feature 708, like the light source 602, the first feature 606, and the second feature 608 may be arranged, such that the optical signal 604 is diffracted by the diffractive element 614 and expanded to the beam 620 and transmitted to the destination balloon based on reflection by the reflective element 616 and partial reflection and partial transmission of the diffracted optical signal by the second feature 608.

As shown in FIG. 7, the diffracted optical signal is shown as comprising two rays, 704D1, 704D2. However, in other examples the diffracted optical signal may comprise less or more than two rays. The ray 704D1 could take the form of or be similar in form to the ray 604D1, and the ray 704D2 could take the form of or be similar in form to the ray 604D2.

Moreover, as shown in FIG. 7, the second feature 708 transmits a second portion 704T21, 704T22 of the diffracted optical signal to the destination balloon, the second feature 708 transmits at least part of the first portion 704T41, 704T42 to the destination balloon, the second diffractive element 726 transmits a second part of the first portion 704R31 of the diffracted optical signal to the destination balloon, and the third diffractive element 728 transmits a third part of the first portion 704R32 of the diffracted optical signal to the destination balloon.

The a second portion 704T21, 704T22 of the diffracted optical signal could take the form of or be similar in form to the second portion 604T21, 604T22 of the diffracted optical signal, the at least part of the first portion 704T41, 704T42 of the diffracted optical signal could take the form of or be similar in form to the at least part of the first portion 604T41, 604T42 of the diffracted optical signal, and the second part of the first portion 704R31 of the diffracted optical signal and the third part of the first portion 704R32 of the diffracted optical signal could take the form of or be similar in form to the at least part of the first portion 604R31, 604R32 of the diffracted optical signal.

Furthermore, as shown in FIG. 7, the reflective element 716 reflects a first portion 704R11, 704R12 of the diffracted optical signal to the second feature 708. And as shown in FIG. 7, the second feature 708 reflects the first portion 704R11, 704R12 of the diffracted optical signal to the reflective element 716, the second feature 708 reflects the second part of the first portion 704R31 of the diffracted optical signal to the second diffractive element 726, and the second feature 708 reflects the third part of the first portion 704R32 of the diffracted optical signal to the third diffractive element 728.

The first portion 704R11, 704R12 of the diffracted optical signal could take the form of or be similar in form to the first portion 604R11, 604R12 of the diffracted optical signal.

Moreover, as illustrated in FIG. 7, the beam 720 is shown as comprising six rays 704T21, 704T22, 704T41, 704T42, 704R31, and 704R32. With this arrangement, the beam 720 may take the form of a graded series of rings. However, in other examples, the beam 720 could comprise less or more than six rays.

Figure 8:
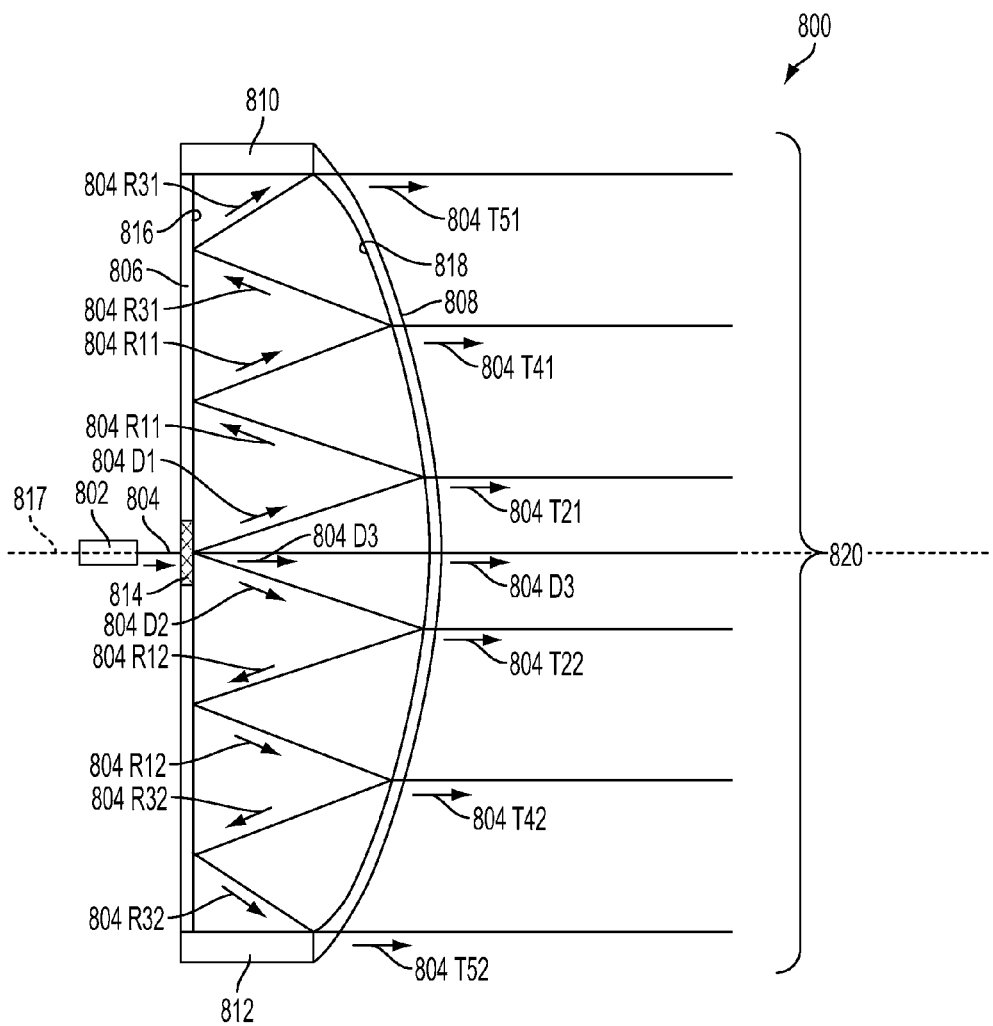
FIG. 8 depicts another transmission apparatus, according to an example embodiment.

FIG. 8 depicts another transmission apparatus 800, according to an example embodiment. In particular, the transmission apparatus 800 may include a second feature 808 having a curved surface. In the illustrated example, the second feature 808 includes a convex surface. However, in other examples, the second feature 808 may include other curved surfaces, such as a concave surface. In an example embodiment, the second feature 808 may include a portion of an envelope of a balloon (e.g., envelope 302).

More specifically, the transmission apparatus 800 may include a light source 802 configured to emit an optical signal 804 having a first dimension, a first feature 806, and the second feature 808. As shown in FIG. 8, the first feature 806 is located between the light source 802 and the second feature 808. And as shown in FIG. 8, the second feature 808 is substantially aligned with the first feature 806.

The light source 802 could take the form of or be similar in form to the light source 602 and/or the light source 702, the optical signal 804 could take the form of or be similar in form to the optical signal 604 and/or the optical signal 704, and the first feature 806 could take the form of or be similar in form to the first feature 606 and/or the first feature 706.

The first feature 806 and the second feature 808 may each be attached to a first spacer 810 and a second spacer 812. The first spacer 810 could take the form of or be similar in form to the first spacer 610, and the second spacer 812 could take the form of or be similar in form to the second spacer 612.

FIG. 8 depicts a side view of the transmission apparatus 800. In some embodiments, the transmission apparatus 800 could be arranged such that a top view of the transmission apparatus 800 may be similar to the side view.

The first feature 806 may include a diffractive element 814 and a reflective element 816. As shown in FIG. 8, the diffractive element 814 is substantially aligned with the light source 802 to receive the optical signal 804. And as shown in FIG. 8, the diffractive element 814 is located on an optical axis 817 of the light source 802.

The diffractive element 814 could take the form of or be similar in form to the diffractive element 614, the first diffractive element 714, the second diffractive element 726, and/or the third diffractive element; the reflective element 816 could take the form of or be similar in form to the reflective element 616 and/or the reflective element 716; and the optical axis 817 could take the form of or be similar in form to the optical axis 617 and/or the optical axis 717.

The second feature 808 may include an inner surface 818 that is partially reflective and partially transmissive. And the inner surface 818 may include a microstructure and/or a coating like the inner surface 618 may include a microstructure and/or a coating and/or the inner surface 718 may include a microstructure and/or a coating. In the illustrated example, the inner surface 818 may not have a microstructure and/or a coating along the optical axis 817.

In an example embodiment, one or more parameters of the inner surface 818 may be selected based on a curvature of the second feature 808 to reduce divergence of the beam 820 that may be caused at least in part to the curvature of the second feature 808. As one example, one or more diffraction angles of the inner surface 818 may be selected (e.g., increased) to reduce divergence of the beam 820 that may be caused at least in part to the curvature of the second feature 808.

The light source 802, the first feature 806, and the second feature 808 may be arranged, such that the optical signal 804 having the first dimension is diffracted by the diffractive element 814 and is expanded to a beam 820 having a second dimension and transmitted to the destination balloon based on reflection of the diffracted optical signal by the reflective element 816 and partial reflection and partial transmission of the diffracted optical signal by the second feature 808, like the light source 602, the first feature 606, and the second feature 608 may be arranged, such that the optical signal 604 is diffracted by the diffractive element 614 and expanded to the beam 620 and transmitted to the destination balloon based on reflection of the diffracted optical signal by the reflective element 616 and partial reflection and partial transmission of the diffracted optical signal by the second feature 608.

As shown in FIG. 8, the diffracted optical signal is shown as comprising three rays, 804D1, 804D2, and 804D3. However, in other examples the diffracted optical signal may comprise less or more than three rays. The ray 804D1 could take the form of or be similar in form to the ray 604D1 and/or the ray 704D1, the ray 804D2 could take the form of or be similar in form to the ray 604D2 and/or the ray 704D2, and the ray 804D3 could take the form of or be similar in form to the ray 604D3.

Moreover, as shown in FIG. 8, the second feature 808 transmits a second portion 804T21, 804T22 of the diffracted optical signal to the destination balloon, the second feature 808 transmits at least part of the first portion 804T41, 804T42 of the diffracted optical signal to the destination balloon, and the second feature 808 transmits a second part of the first portion 804T51, 804T52 of the diffracted optical signal to the destination balloon.

The second portion 804T21, 804T22 of the diffracted optical signal could take the form of or be similar in form to the second portion 604T21, 604T22 of the diffracted optical signal and/or the second portion 704T21, 704T22 of the diffracted optical signal, the at least part of the first portion 804T41, 804T42 of the diffracted optical signal could take the form of or be similar in form to the at least part of the first portion 604T41, 604T42 of the diffracted optical signal and/or the at least part of the first portion 704T41, 704T42 of the diffracted optical signal, and the second part of the first portion 804T51, 804R52 of the diffracted optical signal could take the form of or be similar in form to the second part of the first portion 604T51, 604T52 of the diffracted optical signal.

Furthermore, as shown in FIG. 8, the reflective element 816 reflects a first portion 804R11, 804R12 of the diffracted optical signal to the second feature 808, and the reflective element 816 reflects at least part of the first portion 804R31, 804R32 of the diffracted optical signal to the second feature 808. And as shown in FIG. 8, the second feature 808 reflects the first portion 804R11, 804R12 of the diffracted optical signal to the reflective element 816, and the second feature 808 reflects the at least a part of the first portion 804R31, 804R32 of the diffracted optical signal to the reflective element 816.

The first portion 804R11, 804R12 of the diffracted optical signal could take the form of or be similar in form to the first portion 604R11, 604R12 of the diffracted optical signal and/or the first portion 704R11, 704R12 of the diffracted optical signal, and the at least part of the first portion 804R31, 804R32 of the diffracted optical signal could take the form of or be similar in form to the at least part of the first portion 604R31, 604R32 of the diffracted optical signal and/or the second part of the first portion 704R31 of the diffracted optical signal and the third part of the first portion 704R32 of the diffracted optical signal.

Moreover, as illustrated in FIG. 8, the beam 820 is shown as comprising seven rays 804T21, 804T22, 804T41, 804T42, 804T51, 804T52, and 804D3. The beam 820 could take the form of or be similar in form to the beam 620.

One or more optical elements, such as mirrors and/or lenses, could be located in between a light source (e.g., light source 602, light source 702, and/or light source 802) and a first feature (e.g., first feature 606, first feature 706, and/or first feature 806).

Figure 9:
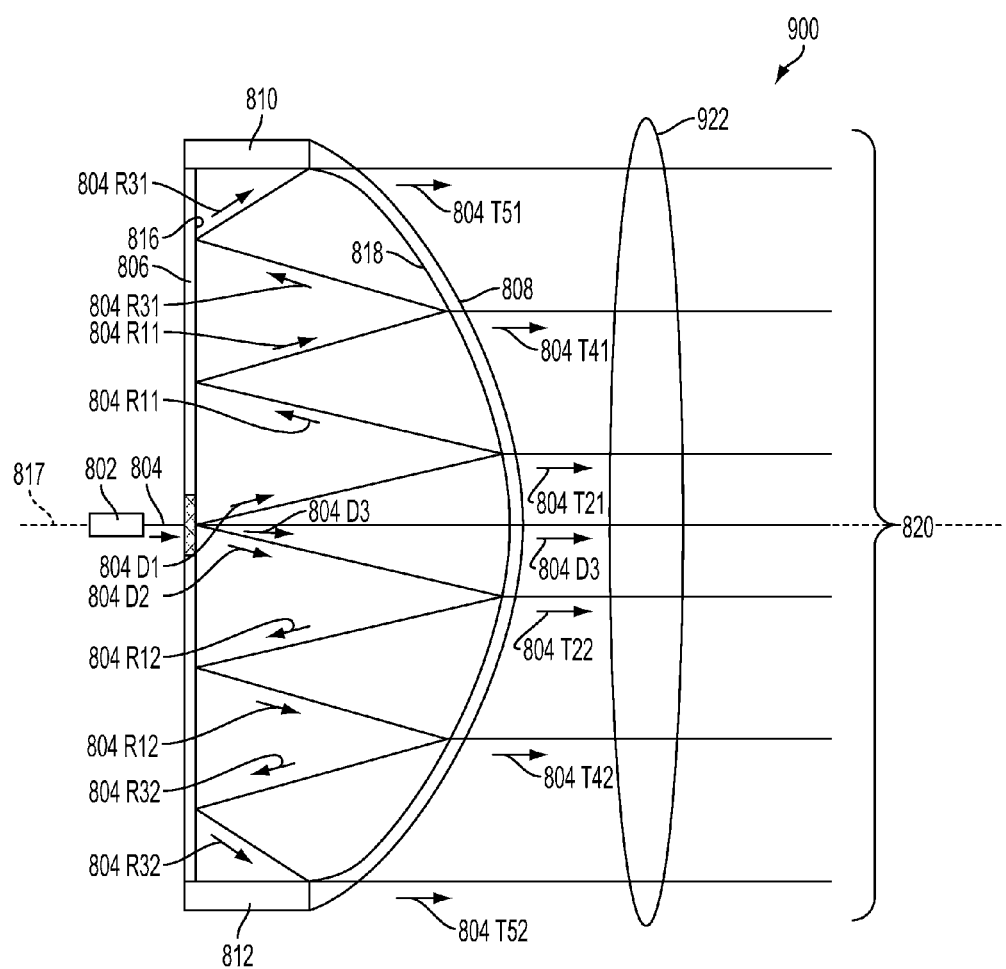
FIG. 9 depicts yet another transmission apparatus, according to an example embodiment.

Moreover, one or more optical elements, such as mirrors and/or lenses, could also be located in between a second feature (e.g., second feature 608, second feature 708, and/or second feature 808) and the destination balloon. For instance, FIG. 9 depicts yet another transmission apparatus 900, according to an example embodiment. In particular, the transmission apparatus 900 includes a lens 922 that is located between the second feature 808 and the destination balloon. (The curvature of the second feature 808 in FIG. 9 is not necessarily depicted as the curvature of the second feature 808 in FIG. 8 is depicted). In the illustrated example, the lens 922 is a converging lens. However, in other examples, the lens 922 could take other forms as well.

Like in the transmission apparatus 800, in the transmission apparatus 900, one or more parameters of the inner surface 818 may be selected based on a curvature of the second feature 808 to reduce divergence of the beam 820 that may be caused at least in part to the curvature of the second feature 808.

Additionally or alternatively, in the transmission apparatus 900, one or more parameters of the lens 922 may selected based on the curvature of the second feature 808 to reduce divergence of the beam 820 that may be caused at least in part to the curvature of the second feature 808. As one example, a focal length of the lens 922 may be selected based on the curvature of the second feature 808 to reduce divergence of the beam 820 that may be caused at least in part to the curvature of the second feature 808.

FIG. 9 depicts a side view of the transmission apparatus 900. In some embodiments, the transmission apparatus 900 could be arranged such that a top view of the transmission apparatus 900 may be similar to the side view.

For purposes of illustration, the transmission apparatus 600, 700, 800, and 900 have been described as transmitting an optical signal to a destination balloon. It should be understood, however, that the transmission apparatus 600, 700, 800, and 900 may also transmit one or more optical signals to other airborne platforms, ground-based stations, and/or space-based platforms.

Figure 10:
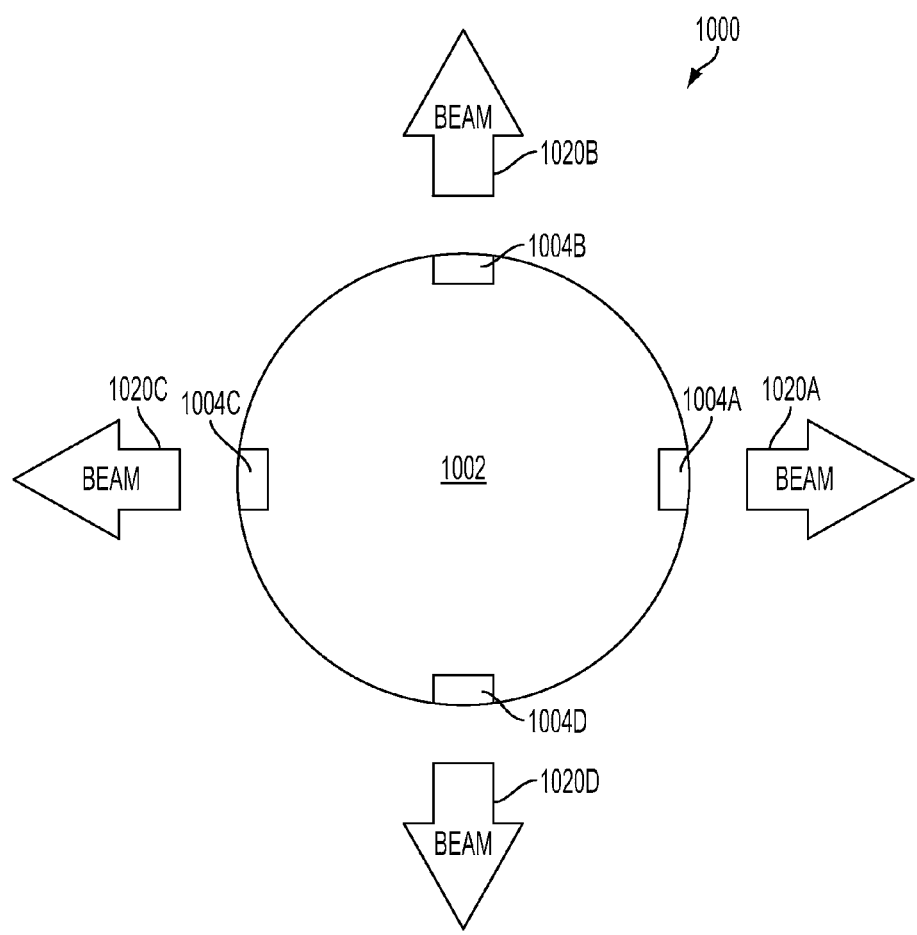
FIG. 10 is a block diagram illustrating an example in which a balloon transmits multiple optical signals, according to an example embodiment.

FIG. 10 is a block diagram illustrating an example 1000 in which a balloon 1002 (e.g., balloon A in FIG. 4) transmits multiple optical signals, according to an example embodiment. As shown in FIG. 10, the balloon 1002 includes transmission apparatus 1004A, transmission apparatus 1004B, transmission apparatus 1004C, and transmission apparatus 1004D. Other transmission apparatus could be present in addition to and/or instead the transmission apparatus depicted in FIG. 10, as this arrangement is presented by way of example.

In the illustrated example, the transmission apparatus 1004A is located 90 degrees from the transmission apparatus 1004B, 180 degrees from the transmission apparatus 1004C, and 90 degrees from the transmission apparatus 1004D; the transmission apparatus 1004B is located 90 degrees from the transmission apparatus 1004C, 180 degrees from the transmission apparatus 1004D, and 90 degrees from the transmission apparatus 1004A; the transmission apparatus 1004C is located 90 degrees from the transmission apparatus 1004D, 180 degrees from the transmission apparatus 1004A, and 90 degrees from the transmission apparatus 1004B; and the transmission apparatus 1004D is located 90 degrees from the transmission apparatus 1004A, 180 degrees from the transmission apparatus 1004B, and 90 degrees from the transmission apparatus 1004C. Other locations of the transmission apparatus 1004A, the transmission apparatus 1004B, the transmission apparatus 1004C, and the transmission apparatus 1004D are possible as well. For instance, the transmission apparatus 1004A, the transmission apparatus 1004B, the transmission apparatus 1004C, and the transmission apparatus 1004D could be located on the balloon 1002 at other predetermined rotational orientations, such as 30 degrees, 45 degrees, 60 degrees, etc.

Moreover, in the illustrated example, a second feature of each of the transmission apparatus 1004A, the transmission apparatus 1004B, the transmission apparatus 1004C, and the transmission apparatus 1004D is a portion of an envelope (e.g., envelope 302) of the balloon 1002. With this arrangement, the transmission apparatus 1004A could take the form of or be similar in form to the transmission the transmission apparatus 800 and/or the transmission apparatus 900, the transmission apparatus 1004B could take the form of or be similar in form to the transmission the transmission apparatus 800 and/or the transmission apparatus 900, the transmission apparatus 1004C could take the form of or be similar in form to the transmission the transmission apparatus 800 and/or the transmission apparatus 900, and the transmission apparatus 1004D could take the form of or be similar in form to the transmission the transmission apparatus 800 and/or the transmission apparatus 900.

However, in other examples, any of the transmission apparatus 1004A, the transmission apparatus 1004B, the transmission apparatus 1004C, and the transmission apparatus 1004D may take the form of or be similar in form to any of the transmission apparatus described herein.

The transmission apparatus 1004A, the transmission apparatus 1004B, the transmission apparatus 1004C, and the transmission apparatus 1004D may each be included in an optical transmitter, such as the optical transmitter 500. With this arrangement, the balloon 1002 may include four optical transmitters. However, in other examples, the balloon 1002 may include less or more than four optical transmitters. And in some embodiments, the four optical transmitters may be located similarly on the balloon 1002 as the transmission apparatus 1004A, the transmission apparatus 1004B, the transmission apparatus 1004C, and the transmission apparatus 1004D are located.

As shown in FIG. 10, the transmission apparatus 1004A transmits a first optical signal in the form of a beam 1020A, the transmission apparatus 1004B transmits a second optical signal in the form of a beam 1020B, the transmission apparatus 1004C transmits a third optical signal in the form of a beam 1020C, and the transmission apparatus 1004D transmits a fourth optical signal in the form of a beam 1020D.

The beam 1020A could take the form of or be similar in form to the beam 620, the beam 720, and/or the beam 820; the beam 1020B could take the form of or be similar in form to the beam 620, the beam 720, and/or the beam 820; the beam 1020C could take the form of or be similar in form to the beam 620, the beam 720, and/or the beam 820; and the beam 1020D could take the form of or be similar in form to the beam 620, the beam 720, and/or the beam 820.

In example 1000, the beam 1020A, the beam 1020B, the beam 1020C, and the beam 1020D could comprise the same or different information.

Moreover, in example 1000, balloon 1002 could transmit each of the beam 1020A, the beam 1020B, the beam 1020C, and the beam 1020D to the same or different destinations, such as one or more destination balloons, other airborne platforms, ground-based stations, and/or space-based platforms.

As noted, the balloon 1002 may include four optical transmitters. In further aspect, the balloon 1002 may further include a first optical receiver, a second optical receiver, a third optical receiver, and a fourth optical receiver. Anyone and/or all of the first, second, third, and fourth optical receivers could take the form of or be similar in form to the optical receiver 420. With this arrangement, the balloon 1002 may include four optical receivers. However, in other examples, the balloon 1002 may include less or more than four optical receivers. And in some embodiments, the four optical receivers may be located similarly on the balloon 1002 as the transmission apparatus 1004A, the transmission apparatus 1004B, the transmission apparatus 1004C, and the transmission apparatus 1004D are located.

In some examples, the optical transmitters and the optical receivers may be used to provide an optical link between the balloon 1002 and one or more other balloons, other airborne platforms, ground-based stations, and/or space-based platforms.

For instance, in some embodiments, the balloon 1002 may be connected to another balloon (e.g., balloon B in FIG. 4) by an optical link via the first optical transmitter and the first optical receiver at a first time period. The one or more optical signals that comprise the optical link could be directional. With this arrangement, when the balloon 1002 and/or the other balloon move and/or rotate relative to each other, the first optical transmitter and the first optical receiver might not be able to maintain the optical link. Accordingly, the balloon 1002 may be configured to handoff the optical link from the first optical transmitter and the first optical receiver to another optical transmitter and another optical receiver, such as the second optical transmitter and the second optical receiver, at a second time period.

Moreover, the optical transmitters and the optical receivers may be used in conjunction with an omni-directional RF communication system (e.g., the RF communication system 318) and an antenna system (e.g., the antenna system 340) located on the balloon 1002 to provide a continuous connection between the balloon 1002 and one or more other balloons, other airborne platforms, ground-based stations, and/or space-based platforms.

For instance, in some embodiments, the balloon 1002 may be connected to another balloon via the first optical transmitter and the first optical receiver at a first time period. The one or more optical signals that comprise the optical link could be directional. With this arrangement, when the balloon 1002 and/or the other balloon move and/or rotate relative to each other, the first optical transmitter and the first optical receiver might not be able to maintain the optical link. And, in some situations, there may be a dead spot based at least in part on a beam angle of the one or more optical signals. Accordingly, the balloon 1002 may be configured to handoff the connection from the first optical transmitter and the first optical receiver to the RF system at a second time period, and handoff the connection from the RF system to another optical transmitter and another optical receiver, such as the second optical transmitter and the second optical receiver, at a third time period.

In some embodiments, the handoff between the first optical transmitter and the first optical receiver to the RF system may be a seamless handoff. And in some embodiments, the handoff between the RF system and the other optical transmitter and the other optical receiver may be a seamless handoff.

V. Illustrative Reception of Optical Signals

Figure 11:
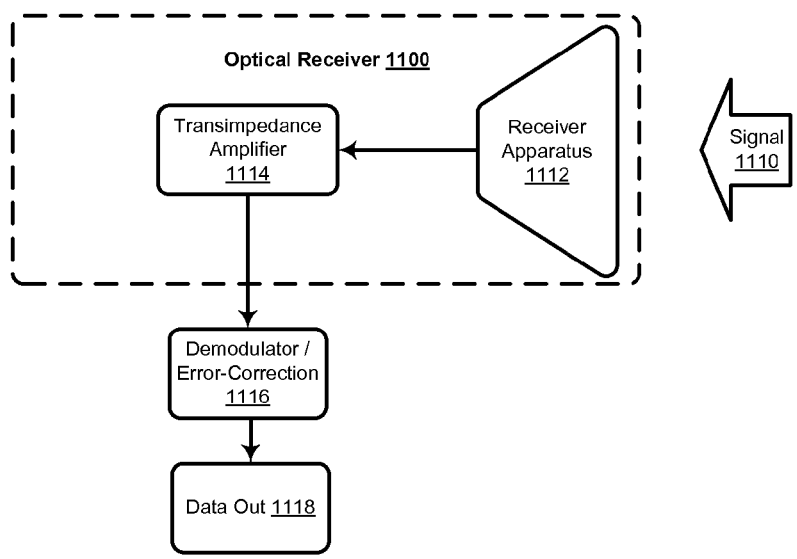
FIG. 11 is a block diagram showing an optical receiver, according to an illustrative configuration.

FIG. 11 is a simplified block diagram showing an optical receiver 1100, according to an illustrative configuration. In some embodiments, the optical receiver 420 could take the form of or be similar in form to the optical receiver 1100.

The optical receiver 1100 could be configured to receive a signal 1110 that could represent part of an optical-communications link. The signal 1100 could be a free-space optical signal with encoded information from a source balloon or another airborne platform. The signal 1110 could also originate from a ground-based station or a space-based platform (e.g., a satellite or other space-craft).

The signal 1110 could be optically collected by receiver apparatus 1112. The receiver apparatus 1112 could include a telescope or any combination of optics (such as refractive lenses and reflective mirrors), amplifiers, filters, and detectors known in the art for receiving free-space optical signals at long distances (e.g., more than several kilometers). In an example embodiment, the receiver apparatus 1112 could transduce the signal 1110 into a photocurrent signal.

The photocurrent signal could then be amplified with a transimpedance amplifier 1114. The transimpedance amplifier 1114 may be configured to convert the photocurrent signal into a voltage and provide signal gain. Other amplifier types are possible, and could be dependent, for instance, upon the output type of the photodetector. For instance, if the receiver apparatus 1112 includes a photoconductive device that produces a photovoltage, a transconductance amplifier could be used to convert the photovoltage to a signal current. Those skilled in the art will understand that there are many other ways to convert a photosignal into an electrical signal, and those other ways are contemplated herein.

The optical receiver 1100 could also include a demodulator/error-correction element 1116, which may be configured to extract information from the signal 1110. The extracted information may comprise data out 1118. The data out 1118 may include information in the form of one or more digital or analog voltage and/or optical intensity levels.

The type of demodulation utilized by the demodulator/error-correction element 1116 may depend upon the type of modulation initially performed on the optical signal. For instance, the demodulation method may include carrier recovery, clock recovery, frame synchronization, pulse compression, error detection and correction, and/or mixing with a local oscillator (e.g., heterodyne detection). Other demodulation methods known in the field of optical and digital signal processing are possible.

The demodulator/error-correction element 1116 could be further configured to detect and correct errors in the as-received signal. For instance, the element 1116 could include a hash function, a checksum algorithm, and/or other redundancy check algorithms in an effort to reduce data transmission errors. Further, error-correcting codes (ECCs) (e.g., Turbo or low-density parity-check codes) could be implemented in the demodulator/error-correction element 1114 to detect and correct errors. If errors are found, the optical receiver 1110 could be configured to correct the error automatically with a forward error correction (FEC) algorithm. Alternatively, the optical receiver 1110 could be configured to send an automatic repeat request (ARQ) to the transmitting node via a reverse channel in an effort to get a new transmission of the data.

Figure 12:
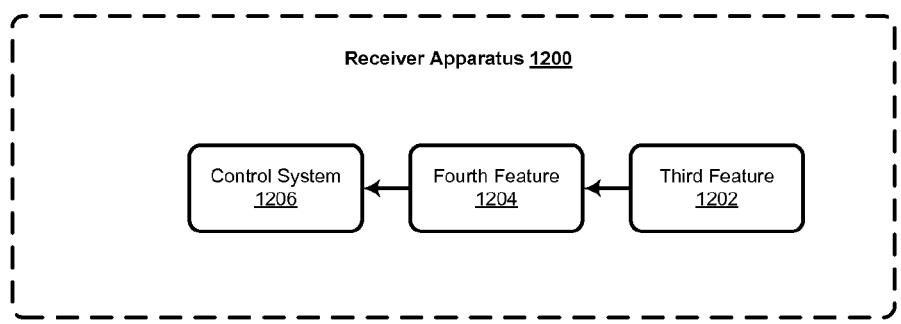
FIG. 12 is a block diagram showing a receiver apparatus, according to an illustrative configuration.

FIG. 12 is a block diagram illustrating a receiver apparatus 1200, according to an example embodiment. In particular, the receiver apparatus 1200 includes a third feature 1202, a fourth feature 1204 having one or more detectors, and a control system 1206. In some embodiments, the fourth feature could be substantially aligned with the third feature.

The third feature 1202 may be configured to receive a second portion of the diffracted optical signal (e.g., 604T21, 604T22; 704T21, 704T22; and/or 804T21, 804T22) and at least part of the first portion of the diffracted optical signal (e.g., 604T41, 604T42; 704T41, 704T42; and/or 804T41, 804T42) from a second feature (e.g., the second feature 608, the second feature 708, and/or the second feature 808) and transmit substantially all of the second portion of the diffracted optical signal and the at least part of the first portion of the diffracted optical signal to the fourth feature 1204.

The one or more detectors may be configured to detect the second portion of the diffracted optical signal and the at least part of the first portion of the diffracted optical signal. Moreover, the control system 1206 may be configured to detect an angular direction of the second portion of the diffracted optical signal and the at least part of the first portion of the diffracted optical signal based on an angle of incidence of the second portion of the diffracted optical signal and the at least part of the first portion of the diffracted optical signal on the one or more detectors.

In some embodiments, the third feature 1202 may be further configured to receive a second part of the first portion of the diffracted optical signal (e.g., 604T51, 604T52; 704R31; 804T51, 804T52) from the second feature and transmit substantially all of the second part of the first portion of the diffracted optical signal to the fourth feature.

And in at least one embodiment, the one or more detectors may be further configured to detect the second part of the first portion of the diffracted optical signal. Moreover, in such an embodiment, the control system 1206 may be further configured to detect an angular direction of the second part of the first portion of the diffracted optical signal based on an angle of incidence of the second part of the first portion of the diffracted optical signal on the one or more detectors.

In some embodiments, the third feature 1202 may be further configured to receive a third part of the first portion of the diffracted optical signal (e.g., 704R32) from the second feature and transmit substantially all of the third part of the first portion of the diffracted optical signal to the fourth feature.

And in at least one embodiment, the one or more detectors may be further configured to detect the third part of the first portion of the diffracted optical signal. Moreover, in such an embodiment, the control system 1206 may be further configured to detect an angular direction of the third part of the first portion of the diffracted optical signal based on an angle of incidence of the third part of the first portion of the diffracted optical signal on the one or more detectors.

The third feature 1202 and the fourth feature 1204 could take various different forms in various different embodiments. In an example embodiment, the third feature 1202 and the fourth feature 1204 could be one or more entities selected from the group consisting of a mirror and a lens. Moreover, in an example embodiment, the third feature 1202 and the fourth feature 1204 could be one or more materials selected from the group consisting of plastic, glass, and metal. For example, the third feature 1202 and the fourth feature 1204 could be metalized Mylar or BoPet.

The one or more detectors could take various different forms in various different embodiments. In an example embodiment, the one or more detectors may comprise an array of photodetectors. The array of photodetectors could include one or more photodiodes, charge-coupled devices (CCD), photoconductors, or other means for photon-sensing known in the art. Moreover, in an example embodiment, the one or more detectors could transduce incident light into a photocurrent signal.

The control system 1206 could take various different forms in various different embodiments. The control system 1206 may be implemented with mechanical systems and/or with hardware, firmware, and/or software. As one example, the control system 1206 may take the form of program instructions stored on a non-transitory computer readable medium and a processor that executes the instructions. The control system 1206 may be implemented in whole or in part on a balloon and/or at least one entity remotely located from the balloon, such as another airborne platform, a ground-based station, and/or a space-based platform. Generally, the manner in which the control system 1206 is implemented may vary, depending upon the particular application.

In some embodiments, the receiver apparatus 1200 may include an optical preamplifier that filters a signal, such as the signal 1110. The optical preamplifier could include one or more of a doped fiber amplifier, semiconductor optical amplifier (SOA), Raman amplifier, and/or a parametric amplifier. Other optical amplifier types are possible within the context of this disclosure.

In some embodiments, the receiver apparatus may include an optical filter that filters the signal. The optical filter could include an absorptive filter, an interference filter, and/or a dichroic filter. The optical signal could be filtered in various ways, for instance based upon wavelength (e.g., in a band-pass filter) and/or polarization (e.g., with a polarizer or waveplate).

VI. CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An apparatus comprising:
   a light source configured to emit an optical signal;
   a first feature comprising a diffractive element and a reflective element, wherein the diffractive element is substantially aligned with the light source to receive the optical signal; and
   a second feature that is substantially aligned with the first feature, wherein an inner surface of the second feature is partially reflective and partially transmissive, wherein the first feature is located between the light source and the second feature;
   wherein the diffractive element of the first feature is configured to diffract the optical signal into two or more rays;
   wherein, at a first location of the second feature, the second feature is configured to: (a) reflect a first portion of the diffracted optical signal to the first feature and (b) transmit a second portion of the diffracted optical signal to a destination balloon;
   wherein the first portion of the diffracted optical signal reflected by the second feature is greater than the second portion of the diffracted optical signal transmitted by the second feature;
   wherein the reflective element of the first feature is configured to reflect the first portion of the diffracted optical signal back to the second feature;
   wherein, at a second location of the second feature, the second feature is further configured to: (a) reflect a part of the first portion of the diffracted optical signal back to the first feature and (b) transmit an additional part of the first portion of the diffracted optical signal to the destination balloon; and
   wherein the part of the first portion of the diffracted optical signal reflected by the second feature is greater than the additional part of the first portion of the diffracted optical signal transmitted by the second feature.

2. The apparatus of claim 1, wherein the light source comprises a laser.

3. The apparatus of claim 1, wherein the optical signal comprises a collimated laser beam.

4. The apparatus of claim 1, wherein the diffractive element is located on an optical axis of the light source.

5. The apparatus of claim 1, wherein the diffractive element comprises a grating.

6. The apparatus of claim 1, wherein the second feature is substantially parallel to the first feature.

7. The apparatus of claim 1, wherein the first and second features comprise one or more entities selected from the group consisting of a mirror and a lens.

8. The apparatus of claim 1, wherein the first and second features comprise one or more materials selected from the group consisting of plastic, glass, and metal.

9. The apparatus of claim 1, wherein the second feature comprises a curved surface.

10. The apparatus of claim 1, wherein the second feature comprises a portion of an envelope of a balloon.

11. The apparatus of claim 1, wherein the inner surface comprises a microstructure that is partially reflective and partially transmissive.

12. The apparatus of claim 11, wherein the microstructure is formed by one or more processes selected from the group consisting of etching and embossing.

13. The apparatus of claim 1, wherein the inner surface comprises a coating that is partially reflective and partially transmissive.

14. The apparatus of claim 13, wherein the coating comprises one or more materials selected from the group consisting of metal and dichroic.

15. The apparatus of claim 1, wherein the inner surface comprises a microstructure and a coating arranged such that the second feature is partially reflective and partially transmissive.

16. The apparatus of claim 1, wherein the second feature further comprises an aperture located on the optical axis of the light source.

17. The apparatus of claim 1, wherein the second feature comprises one or more edges, and wherein substantially all of an incident portion of the diffracted optical signal is transmitted to the destination balloon at the one or more edges of the second feature.

18. The apparatus of claim 1, wherein the additional part of the first portion of the diffracted optical signal transmitted by the second feature is greater than the second portion of the diffracted optical signal transmitted by the second feature.

19. The apparatus of claim 1, wherein the destination balloon comprises:
a third feature;
a fourth feature substantially aligned with the third feature, wherein the fourth feature includes one or more detectors, wherein the third feature is configured to receive the second portion of the diffracted optical signal and the additional part of the first portion of the diffracted optical signal from the second feature and transmit substantially all of the second portion of the diffracted optical signal and the additional part of the first portion of the diffracted optical signal to the fourth feature, wherein the one or more detectors are configured to detect the second portion of the diffracted optical signal and the additional part of the first portion of the diffracted optical signal; and
a control system configured to detect an angular direction of the second portion of the diffracted optical signal and the additional part of the first portion of the diffracted optical signal based on an angle of incidence of the second portion of the diffracted optical signal and the additional part of the first portion of the diffracted optical signal on the one or more detectors.

20. An apparatus comprising:
a light source configured to emit an optical signal;
a first feature comprising a diffractive element and a reflective element, wherein the diffractive element is substantially aligned with the light source to receive the optical signal; and
a second feature that is substantially aligned with the first feature, wherein an inner surface of the second feature is partially reflective and partially transmissive, wherein the first feature is located between the light source and the second feature,
wherein the light source, the first feature, and the second feature are arranged, such that (a) the optical signal emitted from the light source having a first dimension is diffracted by the diffractive element into two or more rays and (b) the diffracted optical signal is expanded to a beam having a second dimension and transmitted to a destination balloon based on reflection of the diffracted optical signal by the reflective element and partial reflection and partial transmission of the diffracted optical signal by the second feature, wherein, at a first location of the second feature, the second feature is configured to: (a) reflect a first portion of the diffracted optical signal to the first feature and (b) transmit a second portion of the diffracted optical signal to the destination balloon, wherein the first portion of the diffracted optical signal reflected by the second feature is greater than the second portion of the diffracted optical signal transmitted by the second feature, wherein, at a second location of the second feature, the second feature is further configured to: (a) reflect a part of the first portion of the diffracted optical signal back to the first feature and (b) transmit an additional part of the first portion of the diffracted optical signal to the destination balloon, and wherein the part of the first portion of the diffracted optical signal reflected by the second feature is greater than the additional part of the first portion of the diffracted optical signal transmitted by the second feature.

* * * * *